(12) United States Patent
Kanumuri et al.

(10) Patent No.: US 9,876,837 B2
(45) Date of Patent: *Jan. 23, 2018

(54) USING CONSTRAINTS ON MEDIA FILE FORMATS TO IMPROVE PERFORMANCE

(71) Applicant: Microsoft Technology Licensing, LLC, Redmond, WA (US)

(72) Inventors: Sandeep Kanumuri, Redmond, MA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/142,163

(22) Filed: Apr. 29, 2016

(65) Prior Publication Data

US 2016/0323349 A1 Nov. 3, 2016

Related U.S. Application Data

(63) Continuation of application No. 14/133,234, filed on Dec. 18, 2013, now Pat. No. 9,330,101.

(51) Int. Cl.
*G06F 17/30* (2006.01)
*H04L 29/06* (2006.01)
(Continued)

(52) U.S. Cl.
CPC ...... *H04L 65/607* (2013.01); *G06F 17/30076* (2013.01); *G06F 17/30371* (2013.01);
(Continued)

(58) Field of Classification Search
CPC ............ H04L 65/607; G06F 17/30371; H04N 21/44008; H04N 21/4516; H04N 21/454; H04N 21/85406; G10L 19/167
(Continued)

(56) References Cited

U.S. PATENT DOCUMENTS 5,537,605 A * 7/1996 Teece ............... G05B 19/41865
345/501
6,011,868 A 1/2000 Van Den Branden et al.
(Continued)

FOREIGN PATENT DOCUMENTS

CN 1860786 A 11/2006
WO 2014035705 A1 3/2014

OTHER PUBLICATIONS

"Guidelines for Implementation: DASH264 Interoperability Points", Retrieved From <<http://web.archive.org/web/20130124005508/http://dashif.org/guidelines/DASH264-base-v09.pdf>>, Jan. 14, 2013, 33 Pages.
(Continued)

*Primary Examiner* — Thanh-Ha Dang
(74) *Attorney, Agent, or Firm* — Patent GC LLC (57) ABSTRACT

A processor that processes encoded media is configured so as to apply constraints to the encoded bitstream. Such constraints are not those required by a specification of a standard with which the encoded media is compliant; instead such constraints reflect portions of the standard that are insufficiently constrained and are applied by the processor to ensure that the processor does not experience performance degradation or errors. The constraints can be applied, for example, as a preprocessing step before reading, writing or decoding the bitstream, or while the bitstream is being decoded, or while the bitstream is being received from a transmission.

20 Claims, 4 Drawing Sheets

(51) Int. Cl.
*H04N 21/44* (2011.01)
*H04N 21/45* (2011.01)
*H04N 21/454* (2011.01)
*H04N 21/854* (2011.01)
*G10L 19/16* (2013.01)

(52) U.S. Cl.
CPC ..... *H04N 21/44008* (2013.01); *H04N 21/454* (2013.01); *H04N 21/4516* (2013.01); *H04N 21/85406* (2013.01); *G10L 19/167* (2013.01)

(58) Field of Classification Search
USPC .......................................................... 707/756
See application file for complete search history.

(56) References Cited

U.S. PATENT DOCUMENTS

| | | | |
|---|---|---|---|
| 6,295,604 B1* | 9/2001 | Callum | G06F 21/602 713/160 |
| 7,822,680 B1* | 10/2010 | Weber | G06Q 40/00 705/35 |
| 9,330,101 B2 | 5/2016 | Kanumuri et al. | |
| 2004/0028387 A1 | 2/2004 | Winter | |
| 2004/0086039 A1 | 5/2004 | Reynolds et al. | |
| 2005/0155071 A1* | 7/2005 | Notoya | H04N 21/85406 725/88 |
| 2005/0281289 A1* | 12/2005 | Huang | H04N 21/23418 370/484 |
| 2006/0037041 A1* | 2/2006 | Zhang | H04N 7/1675 725/32 |
| 2006/0078288 A1 | 4/2006 | Huang et al. | |
| 2006/0092938 A1* | 5/2006 | Gentrix | H04L 29/06 370/390 |
| 2006/0120463 A1 | 6/2006 | Wang | |
| 2006/0288027 A1* | 12/2006 | Murakami | G11B 27/3027 |
| 2007/0198401 A1* | 8/2007 | Kunz | G06Q 40/025 705/38 |
| 2007/0258586 A1* | 11/2007 | Huang | H04N 5/913 380/201 |
| 2009/0055197 A1 | 2/2009 | Lee et al. | |
| 2009/0148056 A1* | 6/2009 | Rodriguez | H04N 19/30 382/235 |
| 2009/0319563 A1 | 12/2009 | Schnell | |
| 2010/0115631 A1 | 5/2010 | Milstein | |
| 2010/0129063 A1 | 5/2010 | Lee | |
| 2010/0153827 A1* | 6/2010 | Koster | H04L 12/1868 714/799 |
| 2010/0185854 A1* | 7/2010 | Burns | G06F 21/10 713/165 |
| 2010/0208825 A1 | 8/2010 | Chou et al. | |
| 2010/0246502 A1* | 9/2010 | Gong | H04L 12/6418 370/329 |
| 2010/0262711 A1 | 10/2010 | Bouazizi | |
| 2010/0274708 A1* | 10/2010 | Allen | G06Q 40/02 705/38 |
| 2010/0290468 A1* | 11/2010 | Lynam | H04L 45/742 370/392 |
| 2011/0110428 A1 | 5/2011 | Chang et al. | |
| 2011/0246660 A1 | 10/2011 | Bouazizi | |
| 2012/0121025 A1 | 5/2012 | Bonaparte et al. | |
| 2012/0233345 A1 | 9/2012 | Hannuksela | |
| 2012/0278610 A1* | 11/2012 | Waller | H04N 21/2347 713/150 |
| 2013/0080316 A1* | 3/2013 | Pawlusiak | G06Q 40/02 705/38 |
| 2013/0103849 A1 | 4/2013 | Mao et al. | |
| 2013/0195204 A1 | 8/2013 | Reznik et al. | |
| 2013/0290492 A1 | 10/2013 | ElArabawy et al. | |
| 2013/0290697 A1 | 10/2013 | Wang et al. | |
| 2014/0040612 A1* | 2/2014 | Swaminathan | H04N 21/23439 713/160 |
| 2014/0215027 A1* | 7/2014 | Janardhanan | H04L 41/0803 709/220 |
| 2015/0169489 A1* | 6/2015 | Edvenson | G06F 13/4022 710/308 |
| 2016/0295257 A1* | 10/2016 | Iguchi | H04N 5/38 |

OTHER PUBLICATIONS

"Information Technology—MPEG Systems Technologies—Part 7: Common Encryption in ISO Base Media File Format Files", In Study of ISO/IEC CD 23001-7, 2nd Edition, Nov. 2013, 22 Pages.

"Information Technology—Coding of Audio—Visual Objects—Part 12: ISO Base Media File Format", In Text of ISO/IEC 14496-12, 4th Edition, May 2012, 190 Pages.

"Microsoft Announces Support for MPEG-DASH in Microsoft Media Platform", Retrieved From <<https://blogs.msdn.microsoft.com/msmediaplatform/2012/04/16/microsoft-announces-support-for-mpeg-dash-in-microsoft-media-platform/>>, Apr. 16, 2012, 3 Pages.

"Notice of Allowance Issued in U.S. Appl. No. 14/133,234", dated Jan. 6, 2016, 9 Pages.

"Non Final Office Action Issued in U.S. Appl. No. 14/133,234", dated Sep. 10, 2015, 11 Pages.

Feuvre, et al. "On Common Encryption", In 106nd MPEG Meeting, ISO/IEC JTC1/SC29/WG11 MPEG2013/M31447, Oct. 23, 2013, 4 Pages.

Kofler, et al., "Implications of the ISO Base Media File Format on Adaptive HTTP Streaming of H.264/SVC", In IEEE consumer Communications and Networking Conference, Jan. 14, 2012, 5 Pages.

"International Preliminary Report on Patentability Issued in PCT Application No. PCT/US2014/069637", dated Nov. 12, 2015, 11 Pages.

"International Search Report and Written Opinion Issued in PCT Patent Application No. PCT/US2014/069637", dated Mar. 23, 2015, 12 Pages.

"Second Written Opinion Issued in PCT Application No. PCT/US2014/069637", dated Sep. 4, 2015, 8 Pages.

Stockhammer, Thomas, "Dynamic Adaptive Streaming over HTTP—Standards and Design Principles", In Proceedings of the Second Annual ACM Conference on Multimedia Systems, Feb. 23, 2011, pp. 133-143.

"Office Action Issued in European Patent Application No. 14828386.4", dated May 4, 2017, 06 Pages.

"First Office Action and Search Report Issued in Chinese Patent Application No. 201480069471.6", dated Jun. 14, 2017, 7 Pages.

\* cited by examiner

USING CONSTRAINTS ON MEDIA FILE FORMATS TO IMPROVE PERFORMANCE

CROSS-REFERENCE TO RELATED APPLICATIONS

This application is a continuation of U.S. patent application Ser. No. 14/133,234, filed Dec. 18, 2013, to be issued as U.S. Pat. No. 9,330,101, on May 3, 2016, and is hereby incorporated by reference.

BACKGROUND

Digital media data, such as audio and video and still images, are commonly encoded into bitstreams that are transmitted or stored in data files, where the encoded bitstreams conform to established standards. Some examples of such standards are formats derived from ISO/IEC 14496-12 (also called MPEG-4 Part 12 or ISOBMFF) and ISO/IEC 23001-7 (also called CENC).

Standards typically allow some flexibility in a media file format, such that two media files may have different formats yet both still will be compliant with the standard. Such flexibility, however, can mean that compliant file formats are insufficiently constrained. When media file formats are insufficiently constrained, decoders, players and other applications and/or devices can experience errors, performance problems or even security problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A processor that processes encoded media is configured so as to apply constraints to the encoded bitstream. In particular, the processor analyzes the encoded bitstream to verify that the encoded bitstream satisfies the constraints, and, if possible, prepares the bitstream to conform to the constraints. Such constraints are not those required by a specification of a standard with which the encoded media is compliant; instead such constraints reflect portions of the standard that are insufficiently constrained and are applied by the processor to ensure that the processor does not experience performance degradation, errors or other processing problems. The constraints can be applied, for example, as a preprocessing step before reading, writing or decoding the bitstream, or while the bitstream is being decoded, or while the bitstream is being received from a transmission.

If such constraints are not met by the encoded bitstream, the processor can take action. For example, if a file is being decoded for playback, playback can be terminated or a portion of the media can be omitted from playback. If a file is being transmitted or stored, such storage or transmission can be terminated.

The processor can be part of, for example, a decoder, bitstream source, playback application, player device or the like, or other application that manipulates an encoded bitstream. For example, a file sharing utility may process downloaded media files after receiving them to apply the specified constraints.

Constraints implemented by the decoder or other media processor include, but are not limited to: constraints on offsets from data to related data; constraints to resolve conflicts between implied values derived using different rules; constraints to ensure that auxiliary data related to sample data is present in the bitstream; and constraints to limit scope of nested data structures; constraints to limit versioning; and using application-level knowledge to directly access data in a bitstream instead of processing intermediate references to that data.

As an alternative to implementing such constraints in a decoder, the specification of the standard can be modified, and an encoder can be built so as to enforce such constraints in the encoding process. Thus an encoded bitstream can be generated that is known to conform to such constraints.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a media processing system with constraints can be implemented.

Figure 1:
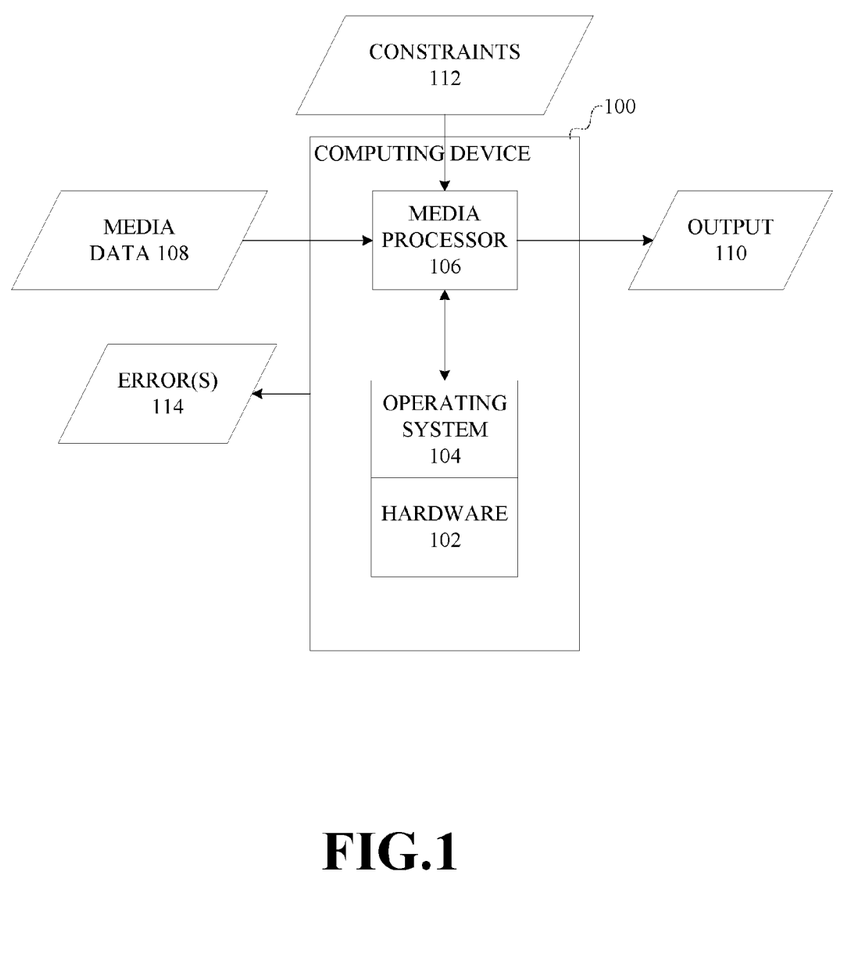
FIG. 1 is a block diagram of an example operating environment in which media processing with constraints can be implemented.

Referring to FIG. 1, an example media processing system includes a computing device 100, which includes hardware 102, and operating system 104 and a media processor 106. In this example, the media processor is an application that runs on the operating system of the device, and the operating system manages access to the resources of the hardware 102. The hardware 102 is described below by the example computer hardware of FIG. 4.

The media processor can implement, for example, a decoder that reads media data 108 which has been encoded into a bitstream that is compliant with a standard data form that the decoder is implemented to handle.

An encoded bitstream generally represents encoded digital media data, such as audio, video, still images, text and auxiliary information. If there are multiple media streams, such as audio and video, the streams of encoded data are multiplexed into a single bitstream. Encoded bitstreams generally are transmitted or stored in data files. Encoded bitstreams, and files they are stored in, generally conform to established standards.

Some examples of such standards for encoding audio and video data are formats derived from ISO/IEC 14496-12 (also called MPEG-4 Part 12 or ISOBMFF) and ISO/IEC 23001-7 (also called CENC).

Many such standards specify structures of data, typically called packets but which may be called other names such as boxes, which include metadata, providing data about the packet, and/or encoded media data, sometimes called essence data, and/or auxiliary information that is associated with the encoded media data, such as encryption information, associated text or other data. Metadata and/or auxiliary information may be defined by named fields which have values. Within an encoded bitstream, some structures typically include other structures, which may include yet other structures, and so on. One structure typically can refer to another structure either directly or indirectly. For example, a packet of video data is related, either directly or indirectly, to another packet of audio data with which it is to be synchronized. As another example, a packet of encrypted data is related to information for decrypting the data.

The specification of the standard defines which structures are required, which structures are optional, and what various structures, fields and field values mean. Thus, a specification defines constraints on the structures that are compliant with the standard. The specification for a compliant bitstream, however, can remain insufficiently constrained. As described herein, additional constraints, not set forth in the specification of a standard, are implemented in a media processor and are used to further constrain an otherwise compliant bitstream.

The decoder can be part of any application that reads and decodes the media data from the encoded bitstream to produce an output 110 while applying constraints 112. The constraints 112 are parameters that limit aspects of the standard that are insufficiently constrained as described below.

The lack of sufficient constraints in the standard increases the risk that errors 114 or other performance degradation will occur when the media data is decoded. Additionally, security risks are increased because a compliant bitstream can be deliberately crafted to exploit the insufficiently constrained standard, and thus attack weaknesses in the decoder or device on which the decoder is operating. For example, a bitstream may include, at one point, a reference to another point in the bitstream from which data is to be retrieved. If that reference point is deep in the bitstream, a large delay, buffer overrun or other problem could occur. An example constraint is to limit the range in which such references can occur.

Constraints implemented by the decoder or other media processor include, but are not limited to: constraints on offsets from data to related data; constraints to resolve conflicts between implied values derived using different rules; constraints to ensure that auxiliary data related to sample data is present in the bitstream; constraints to resolve conflicts in case of conflicting auxiliary data, or meta data encoded in bitstream; and constraints to limit scope of nested data structures; constraints to limit versioning; and using application-level knowledge to directly access data in a bitstream instead of processing intermediate references to that data.

In another implementation, the media processor can implement a media file processor that is an application that receives encoded media data. The media file processor can be implemented in a similar way as the media file decoder in terms of its ability to read an encoded bitstream and apply the constraints as described below. Such a media file processor can analyze stored or transmitted bitstreams to apply the constraints as part of an application that manages media data, such as a media file sharing application.

Figure 2:
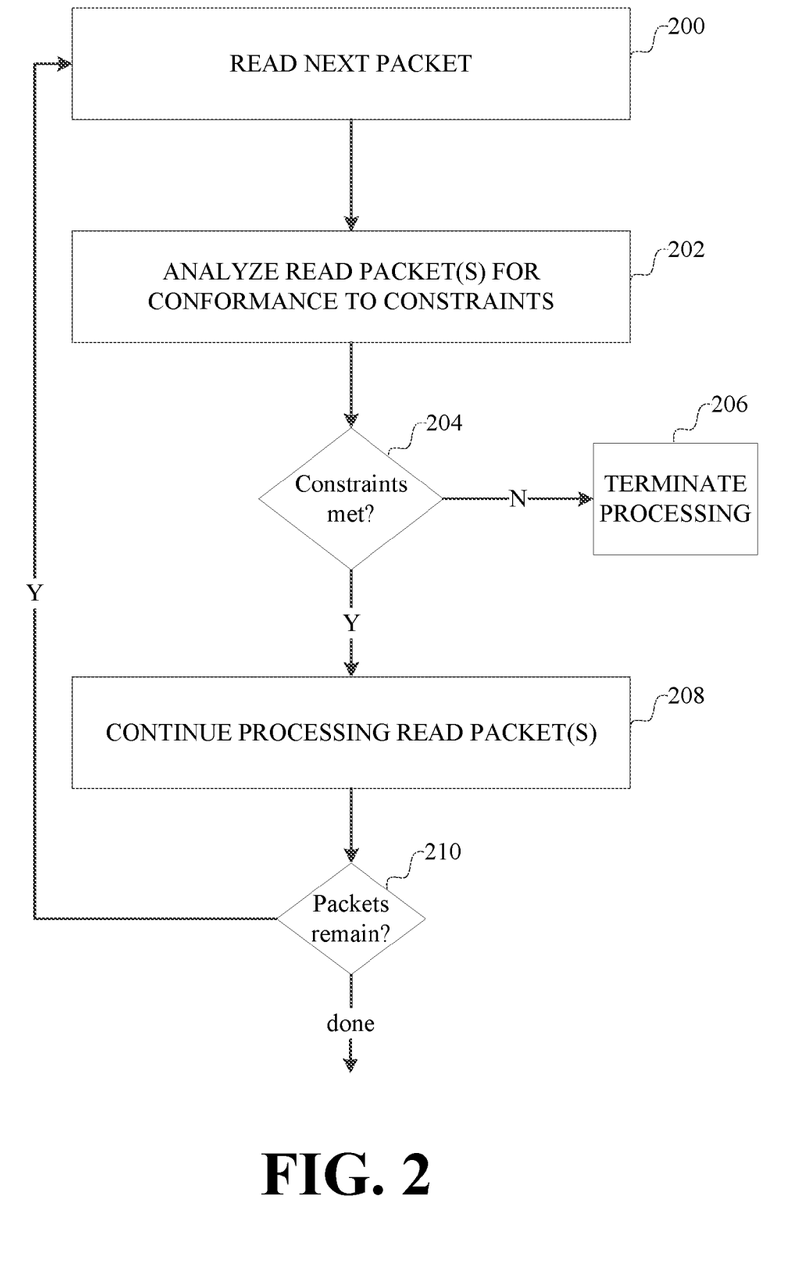
FIG. 2 is a flow chart describing an example implementation of a decoder

Referring now to FIG. 2, an example flowchart describing an example operation of a media data decoder will now be described. In this example, it is assumed that the bitstream is formed by a sequence of packets of data, and that each packet is read sequentially. The process begins by reading 200 a next packet to be processed from the bitstream. The packet is then analyzed 202 to determine whether it conforms to the constraints applied by the decoder. During analysis of a packet, the processor may use information from older packets or may delay processing of current packet if processing requires some future packets. If the constraints are not met, as determined at 204, then playback can be terminated 206. Otherwise, processing that packet (and earlier packets) continues at 208. Such processing can involve buffering the current packet for later processing in connection with other subsequent packets. After buffering or otherwise processing read packets, the next packet is read 200 from the bitstream if one or more packets remain to be processed from the bitstream, as determined at 210.

Figure 3:
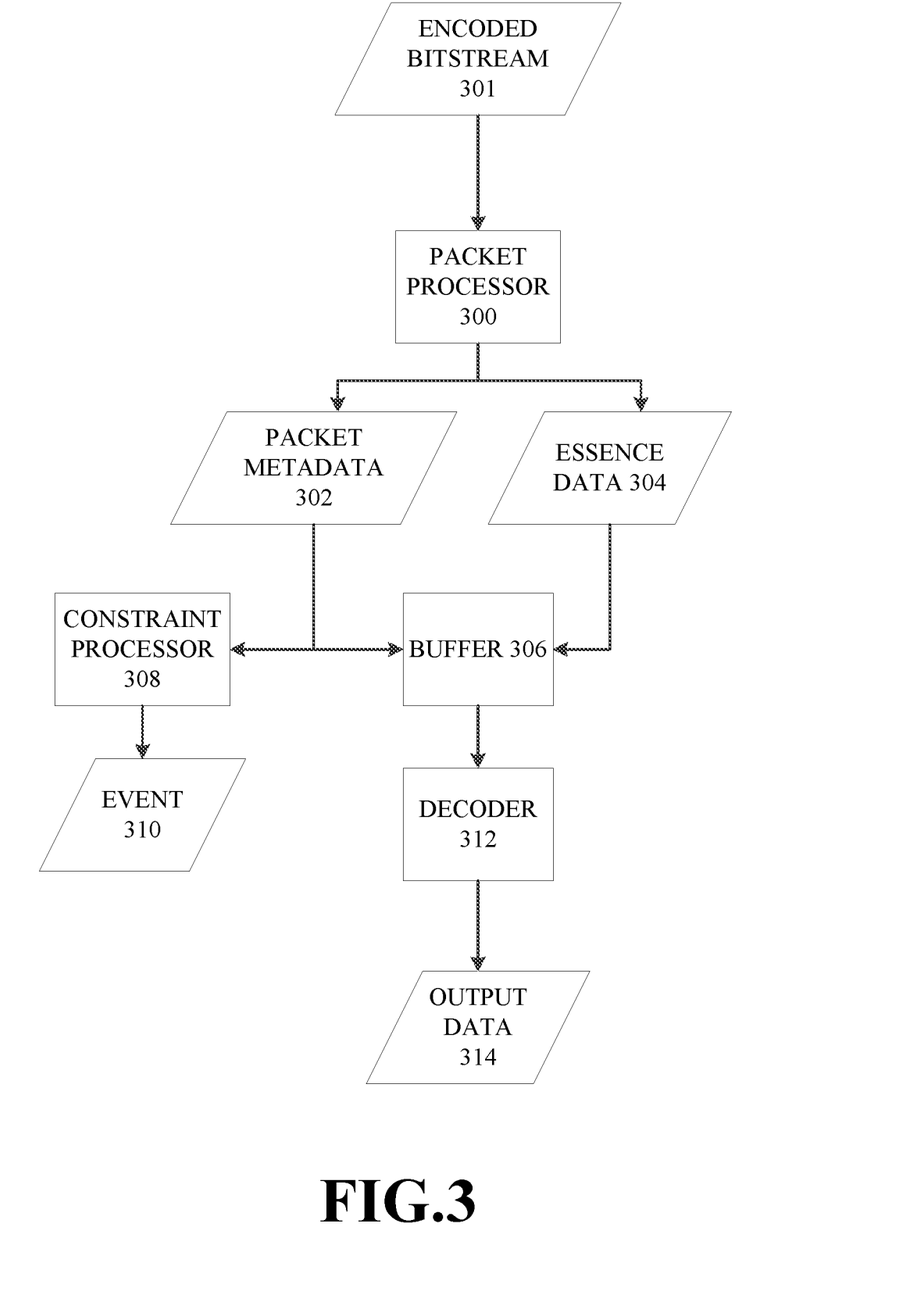
FIG. 3 is a data flow diagram illustrating an example implementation of a decoder.

Referring now to FIG. 3, a data flow diagram of an example implementation of a media decoder will now be described. The media decoder includes a packet processor 300 which receives an encoded bitstream 301 at an input, and extracts and outputs packet metadata 302 and essence (actual video, image or audio) data 304, both of which are placed in a buffer 306. Separate buffers can be provided for packet metadata data and essence. A constraint processor 308 analyzes the packet metadata 302 to determine whether constraints are met. The constraint processor can signal an event 310 indicating a constraint that is not met when such a condition occurs. The data from the buffer 306 is processed by a decoder 312 that produces output data 314, such as decoded audio, image or video data.

Constraints Examples for ISO/IEC 14496-12 and 23001-7

Given an example implementation and operation, some examples of the various kinds of constraints will now be described. These examples are related to formats derived from ISO/IEC 14496-12 (also called MPEG-4 Part 12 or ISOBMFF) and ISO/IEC 23001-7 (also called CENC).

Constraint 1

In ISOBMFF, one kind of structure in a packet of data is an 'saio' box, which is contained within another structure called a 'moov' or 'moof' box. An 'saio' box signals the offset(s) information where auxiliary information can be found within an encoded bitstream. The 'saio' box is used in CENC to signal the offset(s) at which sample encryption data (Initialization Vector, Sub-Sample data) can be found.

In ISOBMFF, another kind of structure in a packet of data is an 'saiz' box, which also is contained within another structure called a 'moov' or 'moof' box. An 'saiz' box signals the size of auxiliary information for each sample. The 'saiz' box is used by CENC to signal the size of sample encryption data for each sample.

The CENC specification states that 'saio' and 'saiz' boxes which do not signal a field 'aux_info_type' or which signal a field 'aux_info_type' with a value of 'cenc' are boxes that carry sample encryption data as sample auxiliary information.

ISOBMFF and CENC compliant encoded bitstreams are insufficiently constrained because the offsets indicating where the auxiliary information can be found are not constrained, meaning that the auxiliary information could be anywhere in the encoded bitstream.

The following five examples are alternative ways to apply constraints to the location of auxiliary information signaled using the 'saio' and 'saiz' boxes. The auxiliary information of specific interest is the sample encryption data.

1) All of the auxiliary information indicated using 'saio'/'saiz' boxes shall be present inside the parent 'moov'/'moof' box (under which the 'saio'/'saiz' boxes are found).

2) All of the auxiliary information indicated using 'saio'/'saiz' boxes shall be present in one of the following locations:
   a. inside the parent 'moov'/'moof' box (under which the 'saio'/'saiz' boxes are found)
   b. outside and after the parent 'moov'/'moof' box (under which the 'saio'/'saiz' boxes are found) and before the sample data for any sample represented by the parent 'moov'/'moof' box.

3) All of the auxiliary information indicated using 'saio'/'saiz' boxes shall be present in one of the following locations:
   a. inside the parent 'moov'/'moof' box (under which the 'saio'/'saiz' boxes are found)
   b. outside and after the parent 'moov'/'moof' box (under which the 'saio'/'saiz' boxes are found); furthermore, the auxiliary information for any sample shall be present before the sample data for that sample.

4) The auxiliary information indicated using 'saio'/'saiz' boxes for a sample shall be present in one of the following locations
   a. inside the parent 'moov'/'moof' box (under which the 'saio'/'saiz' boxes are found)
   b. outside and after the parent 'moov'/'moof' box (under which the 'saio'/'saiz' boxes are found) and before the sample data for any sample represented by the parent 'moov'/'moof' box.

5) The auxiliary information indicated using 'saio'/'saiz' boxes for a sample shall be present in one of the following locations
   a. inside the parent 'moov'/'moof' box (under which the 'saio'/'saiz' boxes are found)
   b. outside and after the parent 'moov'/'moof' box (under which the 'saio'/'saiz' boxes are found); furthermore, the auxiliary information for the sample shall be present before the sample data for the sample.

Each of the above sets of constraints helps to simplify the implementation of the decoder and to establish boundary checks on the offsets and sizes indicated using the 'saio' and 'saiz' boxes. In the absence of any constraint on the location of the auxiliary information, there is a risk that the decoder will be presented with an arbitrary offset value, for which the decoder may have to either buffer data until that location in the bitstream is reached and/or cause seek operations in storage to read data at that location. Such offsets, in addition to degrading performance, could be manipulated to exploit security vulnerabilities and orchestrate attacks on the player application or the computer device on which it is operating.

Constraint 2

Specifications for standards often allow data to be omitted, and the absence of such data results in a value being implied, with the implied value being set forth in the specification of the standard. However, it is possible for different rules in the specification to provide conflicting implicit values. Therefore, another constraint is a mechanism to resolve conflicts between implied values derived from two or more rules from a specification.

In particular, in the ISOBMFF spec definition of 'saio' and 'saiz' boxes, the field 'aux_info_type' (that indicates the nature of information conveyed at the location indicated by these boxes) is optional. When this field is omitted, ISOMBFF sets forth that an implied value is obtained in the following way:

"If aux_info_type and aux_info_type_parameter are omitted then the implied value of aux_info_type is either (a) in the case of transformed content, such as protected content, the scheme_type included in the Protection Scheme Information box or otherwise (b) the sample entry type."

In ISOBMFF, there can be many Protection Scheme Information boxes ('sinf' boxes) signaled for a particular track. Each box may signal a different 'scheme_type'. ISOBMFF does not clarify how conflicts with implicit derivation should be resolved.

The CENC specification allows the usage of 'saio' and 'saiz' boxes without explicitly signaling the 'aux_info_type' field. According to the CENC specification, a value of 'cenc' is implied for the 'aux_info_type' field, if empty, when the 'scheme_type' field is 'cenc'. However, there could be other schemes (and or sample entries) that can be defined independent to CENC and may define a different implicit derivation.

Accordingly, in an implementation supporting ISOBMFF and CENC, examples of a constraint to be applied to resolve such conflict are the following:

1) The implicit derivation from CENC shall have precedence over all other implicit derivations and all new specifications deriving from ISOBMFF shall require the explicit signaling of 'aux_info_type' field.

2) The order of precedence for implicit derivation shall be based on the order in which 'sinf' boxes appear inside the parent 'trak' box. An implicit derivation from the sample entry type will have lower precedence compared to any implicit derivation derived from a 'sinf' box.

Without a constraint for resolving conflicts in deriving implicit values, such as for the above constraints for ISOBMFF, a player may not be able to support properly content that is compliant with a specification. In particular, if logic to resolve conflicts for implicit derivation is not provided, errors likely will occur.

Constraint 3

If order of occurrence of data in the encoded bitstream is used to constrain the derivation of implicit values, such as in Constraint 2 above, another constraint can be applied to ensure a desired order of occurrence.

As an example, in Constraint 2, in a CENC-compliant data stream, an 'aux_info_type' field in a 'saio' and 'saiz' boxes can be unspecified, and the order of 'sinf' boxes in a parent 'trak' box can be used to derive the value for this field. An additional constraint can be used to ensure that a particular 'sinf' box occurs in the data stream to resolve the implicit derivation of the 'aux_info_type' field. Thus, for CENC-compliant data streams, the decoder can enforce the following constraint: if any 'saio' or 'saiz' box does not explicitly signal an 'aux_info_type' field, then the 'sinf' box representing a 'scheme_type' of 'cenc' shall be the first 'sinf' box among all 'sinf' boxes in the parent 'trak' box.

Constraint 4

ISOBMFF and CENC-compliant data streams also are insufficiently constrained in the association between auxiliary information and samples if a structure, such as an 'saio' box, represents data for multiple samples. In particular, it is possible for the location specified for auxiliary information for one sample to be the same as or overlap with the location specified for auxiliary information for another sample.

One of the following constraints, as examples, can be used by a decoder for ISOBMFF or CENC-compliant data to constrain the references to auxiliary information:

1) Any 'entry_count' field signaled in an 'saio' box shall have a value equal to 1; or 2) Any offset values signaled in an 'saio' box shall be such that there is no overlap in the location of auxiliary information for any two samples.

Constraint 5

ISOBMFF and CENC-compliant data streams also are insufficiently constrained in associating auxiliary information and samples, in that it is possible for required auxiliary information to be absent in the encoded bitstream. For example, if a structure does not cover all samples expected of that structure, and the auxiliary information for the samples is defined by the structure representing the samples, the samples not represented/covered by the structure would not be associated with correct auxiliary information. In particular, ISOBMFF allows the construction of 'saiz' boxes that do not cover all samples. In such a case, the decoder implementation handles the non-existence of auxiliary information for a sample. If the auxiliary information is required to process the samples, of which sample encryption data is an example, the decoder cannot process the samples without the auxiliary information and signals an error. The decoder could have additional checks to allow decoding if the sample is not encrypted but signal an error if the sample is encrypted.

To handle this problem, an example of a constraint that can be applied by the decoder is the following:

For a 'Sample Auxiliary Information Sizes' box appearing in a 'Sample Table' box, a 'sample_count' field value within the 'Sample Auxiliary Information Sizes' box shall be the same as a 'sample_count' field value within the 'Sample Size' box or 'Compact Sample Size' box. For a 'Sample Auxiliary Information Sizes' box appearing in a 'Track Fragment' box the 'sample_count' field value within the 'Sample Auxiliary Information Sizes' box shall be the same as the sum of the 'sample_count' field values within the 'Track Fragment Run' boxes of the 'Track Fragment' box.

Constraint 6

In some cases, the location of auxiliary information can be explicit and/or derived in multiple ways. Such flexibility would increase the implementation cost for a decoder if the decoder is implemented to support these additional modes. While such additional modes may occur very infrequently, any decoder would produce errors if it did not support these additional modes.

As an example, the ISOBMFF specification, when using the CENC scheme to signal sample encryption data, allows an 'saiz' box (containing encryption data) to be not present within a 'traf' box (containing an 'saio' box with corresponding encrypted sample data), but the information can be derived from an 'saiz' box signaled for the track in the 'moov' box.

To reduce the number of modes the decoder implements, a constraint can be placed on the location of the auxiliary information. In this example, the presence of an 'saiz' box can be constrained to be within a 'traf' box when using the CENC scheme to signal sample encryption data. One way to describe such a constraint in CENC is to state the following:

For every 'saio' box within a 'traf' box, there shall exist a matching (same 'aux_info_type' and 'aux_info_type_parameter' fields, whether explicitly signaled or implicitly derived) 'saiz' box within the same 'traf' box.

Constraint 7

Another area in which a bitstream specification can be insufficiently constrained is in the definition and use of versions. A decoder can be implemented to handle only known versions at the time of implementation; however, if new versions are defined the decoder may be obsolete. Also, the decoder could receive a bitstream with an invalid version number.

As an example, the ISOBMFF specification includes a definition of an 'saio' box that is versioned. The current definition of an 'saio' box does not indicate what versions of 'saio' are defined using the existing definition. The current specification only provides for two versions, allowing other version numbers for future use; however, the specification does not clearly mandate that other versions (reserved for future use) should not be used in bitstream being produced to be compliant with the current specification. A decoder can be implemented both to use information indicating whether a version is reserved or not for future use and to accept or reject bitstreams indicating versions accordingly.

As an example, a constraint for handling ISOBMFF-compliant data can be to implement of the following:

1) The definition of 'saio' shall be applicable only when versions 0 and 1 are used. All other versions are reserved for future use.

b) The definition of 'saio' shall be applicable for all versions.

Constraint 8

It also may be desirable to constrain how structures are contained within other structures. Such nesting of structures, if allowed to be either zero or unlimited, introduces complexities in decoder implementation and can give rise to performance degradation and/or targeted attacks due to the need to buffer and/or search for interrelated data structures. Structures with zero nested structures represent degenerate cases that can be left unsupported, while structures with large numbers of nested structures can create performance problems.

For example, according to the ISOBMFF specification, zero or more 'traf' boxes can be contained within a 'moof' box. A constraint can be applied in the decoder on the number of 'traf' boxes within a 'moof' box. Example definitions of such a constraints include the following:

1) There shall be one and only one 'traf' box within a 'moof' box

2) There shall be at least one 'traf' box within a 'moof' box and a maximum of one 'traf' box for each 'track_ID'.

3) There shall be at least one 'traf' box within a 'moof' box

Constraint 9

Similar to Constraint 8, according to the ISOBMFF specification, zero or more 'trun' boxes can be contained within a 'traf' box. A constraint can be applied in the decoder on the number of 'trun' boxes within a 'traf' box. Example definitions of such a constraints include the following:

1) There shall be one and only one 'trun' box within a 'traf' box.

2) There shall be at least one 'trun' box within a 'traf' box.

Constraint 10

Also similar to Constraint 8, according to the ISOBMFF specification, zero or more samples can be contained within a 'trun' box. A constraint can be applied in the decoder on the number of samples within a 'trun' box. An example definition of such a constraint is the following: the sample_count field signaled in the 'trun' box shall be greater than 0.

The above constraints 8 through 10 on the number of 'traf' boxes, 'trun' boxes, and samples in 'moof' boxes, 'traf' boxes and 'trun' boxes, respectively, help to avoid degenerate cases (e.g., 'moof' boxes with no samples). It is an unnecessary burden on decoder implementations to support degenerate cases. Instead, bitstreams including these cases can be detected and rejected.

Constraint 11

Another way in which a bitstream specification can be insufficiently constrained is if structures can contain data of mixed types. For example, if a structure can contain both encrypted and unencrypted samples, then the decoder implementation is made more complex.

As an example, the ISOBMFF specification allows a 'traf' box to include both encrypted samples and unencrypted samples. An example definition of a constraint that can be implemented in the decoder is the following: a 'traf' box shall not have non-zero clear samples and non-zero encrypted samples at the same time (i.e., either all samples in a 'traf' box are clear samples or all samples in a 'traf' box are encrypted samples).

Another complexity introduced by standards is that there may be multiple indirect references from one data structure to another data structure from which related data are to be retrieved. Other application-level specifications may constrain the use of a standard so that such references are further constrained. In particular, such specifications may define, for a given data structure, known locations of data related to that data structure. The additional constraints of a known application-level specification can be used to directly obtain related data from a known location without processing the indirect references from one data structure to other data.

For example, according to the CENC specification, the 'saio' and 'saiz' boxes signal the location of sample encryption data. However, a decoder procuring the sample encryption data using the information from 'saio' and 'saiz' boxes may have security risks, implementation complexity and performance penalties depending on how the offsets are constructed. Application-level specifications, such as CFF and PIFF, constrain the storage of sample encryption data to be within a 'moof' box. For example, according to CFF, the sample encryption data is stored within an 'senc' box.

In this example, if the decoder is implemented using application-level specifications that constrain the storage of sample encryption data to a well-identified box, then the decoder can directly parse that 'senc' box to procure sample encryption data and avoid the security risks and performance penalties involved with procuring the sample encryption data using the information from 'saio' and 'saiz' boxes.

The foregoing examples are intended to illustrate, not limit, techniques used to implement constraints on an encoded bitstream. These constraints involve, for example, limiting the scope of references to additional data, and constraining data to limit a number of modes supported by the decoder. By applying such constraints, implementation complexity of a decoder is reduced, and performance and security are increased.

As an alternative to implementing such constraints in a decoder, the specification of the standard can be modified, and an encoder can be built so as to enforce such constraints in the encoding process. Thus an encoded bitstream can be generated that is known to conform to such constraints.

Figure 4:
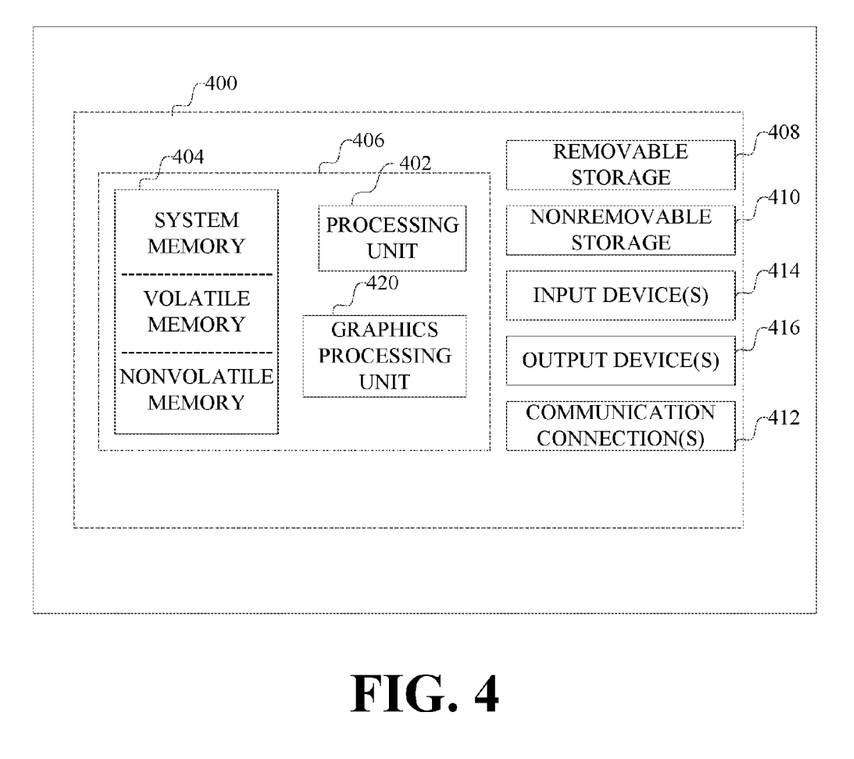
FIG. 4 is a block diagram of an example computing device with which components of such a system can be implemented.

Having now described an example implementation, FIG. 4 illustrates an example of an example computer in which such techniques can be implemented. This is only one example of a computer and is not intended to suggest any limitation as to the scope of use or functionality of such a computer.

The following description is intended to provide a brief, general description of a suitable computer with which such a system can be implemented. The computer can be any of a variety of general purpose or special purpose computing hardware configurations. Examples of well-known computers that may be suitable include, but are not limited to, game consoles, set top boxes, personal computers, hand-held or laptop devices (for example, media players, notebook computers, cellular phones, personal data assistants, voice recorders), server computers, multiprocessor systems, microprocessor-based systems, programmable consumer electronics, network PCs, minicomputers, mainframe computers, distributed computing environments that include any of the above systems or devices, and the like.

With reference to FIG. 4, an example computer 400, in a basic configuration, includes at least one processing unit 402 and memory 404. The computer can have multiple processing units 402. A processing unit 402 can include one or more processing cores (not shown) that operate independently of each other. Additional co-processing units, such as graphics processing unit 420, also are provided. Depending on the configuration and type of computer, memory 404 may be volatile (such as RAM), non-volatile (such as ROM, flash memory, etc.) or some combination of the two. This configuration is illustrated in FIG. 4 by dashed line 406. The computer 400 may include additional storage (removable and/or non-removable) including, but not limited to, magnetic or optical disks or tape. Such additional storage is illustrated in FIG. 4 by removable storage 408 and non-removable storage 410.

A computer storage medium is any medium in which data can be stored in and retrieved from addressable physical storage locations by the computer. Computer storage media includes volatile and nonvolatile, removable and non-removable storage media. Stored data can include, but is not limited to, computer program instructions, data structures, program modules or other data. Memory 404, removable storage 408 and non-removable storage 410 are all examples of computer storage media. Examples of computer storage media include, but are not limited to, RAM, ROM, EEPROM, flash memory or other memory technology, CD-ROM, digital versatile disks (DVD) or other optically or magneto-optically recorded storage device, magnetic cassettes, magnetic tape, and magnetic disk storage.

Computer 400 may also contain communications connection(s) 412 that allow the device to communicate with other devices over a communication medium. Communication media typically carry computer program instructions, data structures, program modules or other data in a modulated data signal such as a carrier wave or other transport mechanism and include any information transmission medium. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 412 are devices that interface with the communication media to transmit data over and receive data from communication media, such as a network interface.

Computer 400 may have various input device(s) 414 such as a keyboard, mouse, pen, camera, touch input device, and so on. Output device(s) 416 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on a computer generally is implemented by one or more computer programs executed by one or more processing units. The computer program can include computer-executable instructions and/or computer-interpreted instructions. Such instructions, when processed by a processing unit, instruct the processing unit to perform particular tasks or implement particular abstract data types. A computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
   receiving into memory a bitstream of encoded data, the encoded data being compliant with a defined standard and including packets of data and comprising sample data and auxiliary information corresponding to the sample data;
   analyzing the bitstream, using a processor connected to the memory, for compliance with additional constraints, including at least resolving conflicts between implied values derived for an optional data field in the encoded bitstream using two or more rules from a specification and applied to another data field in the encoded bitstream, by:
      identifying a first structure in a packet, the first structure having an omitted optional data field with respect to the specification;
      identifying a second structure in the packet, the second structure having a data field;
      wherein the first and second structure are contained in a third structure in the bitstream;
      wherein the third structure comprises a plurality of such second structures;
      applying an order of preference to select one of the plurality of second structures; and
      applying one of the two or more rules to the data field of the selected second structure to provide a value for the omitted optional data field of the first structure; and
   continuing processing the bitstream with the processor only after the bitstream complies with the additional constraints.

2. The computer-implemented process of claim 1, wherein the first structure comprises offset information, the offset information indicating a location of auxiliary information in the bistream, the auxiliary information corresponding to sample data, and wherein the omitted data field comprises a data field indicating a type of the auxiliary information, and wherein the data field of the second structure provides the type for the auxiliary information.

3. The computer-implemented process of claim 2, further comprising ensuring the location of the auxiliary information is in the bitstream prior to the corresponding sample data.

4. The computer-implemented process of claim 1, wherein the order of preference is based on at least type of the second structure.

5. The computer-implemented process of claim 1, wherein the order of preference is based on at least order of appearance of the second structures in the third structure.

6. The computer-implemented process of claim 1, wherein processing the bitstream comprises decoding the bitstream.

7. The computer-implemented process of claim 1, wherein processing the bitstream comprises storing the bitstream.

8. An article of manufacture comprising:
   a computer storage medium comprising at least one of a memory or persistent storage;
   computer program instructions stored on the computer storage medium which, when processed by a processing device, instruct the processing device to perform a process comprising:
      receiving into memory a bitstream of encoded data, the encoded data being compliant with a defined standard and including packets of data and comprising sample data and auxiliary information corresponding to the sample data;

analyzing the bitstream, using a processor connected to the memory, for compliance with additional constraints, including at least resolving conflicts between implied values derived for an optional data field in the encoded bitstream using two or more rules from a specification and applied to another data field in the encoded bitstream, by:

identifying a first structure in a packet, the first structure having an omitted optional data field with respect to the specification;

identifying a second structure in the packet, the second structure having a data field;

wherein the first and second structure are contained in a third structure in the bitstream;

wherein the third structure comprises a plurality of such second structures;

applying an order of preference to select one of the plurality of second structures; and applying one of the two or more rules to the data field of the selected second structure to provide a value for the omitted optional data field of the first structure; and continuing processing the bitstream with the processor only after the bitstream complies with the additional constraints.

9. The article of manufacture of claim 8, wherein the first structure comprises offset information, the offset information indicating a location of auxiliary information in the bistream, the auxiliary information corresponding to sample data, and wherein the omitted data field comprises a data field indicating a type of the auxiliary information, and wherein the data field of the second structure provides the type for the auxiliary information.

10. The article of manufacture of claim 8, wherein the order of preference is based on at least type of the second structure.

11. The article of manufacture of claim 8, wherein the order of preference is based on at least order of appearance of the second structures in the third structure.

12. The article of manufacture of claim 8, wherein processing the bitstream comprises decoding the bitstream.

13. The article of manufacture of claim 8, wherein processing the bitstream comprises storing the bitstream.

14. The article of manufacture of claim 9, further comprising ensuring the location of the auxiliary information is in the bitstream prior to the corresponding sample data.

15. A computer comprising:

a media processor executing on hardware with an operating system, the media processor being configured to:

access memory that stores a bitstream of encoded data, the encoded data being compliant with a defined standard and including packets of data and comprising sample data and auxiliary information corresponding to the sample data;

analyze the bitstream for compliance with additional constraints, including at least resolving conflicts between implied values derived for an optional data field in the encoded bitstream using two or more rules from a specification and applied to another data field in the encoded bitstream, by:

identifying a first structure in a packet, the first structure having an omitted optional data field with respect to the specification;

identifying a second structure in the packet, the second structure having a data field;

wherein the first and second structure are contained in a third structure in the bitstream;

wherein the third structure comprises a plurality of such second structures;

applying an order of preference to select one of the plurality of second structures; and applying one of the two or more rules to the data field of the selected second structure to provide a value for the omitted optional data field of the first structure; and continue processing the bitstream with the processor only if after the bitstream complies with the additional constraints.

16. The computer of claim 15, wherein the first structure comprises offset information, the offset information indicating a location of auxiliary information in the bistream, the auxiliary information corresponding to sample data, and wherein the omitted data field comprises a data field indicating a type of the auxiliary information, and wherein the data field of the second structure provides the type for the auxiliary information.

17. The computer of claim 15, wherein the order of preference is based on at least type of the second structure.

18. The computer of claim 15, wherein the order of preference is based on at least order of appearance of the second structures in the third structure.

19. The computer of claim 15, wherein processing the bitstream comprises decoding the bitstream.

20. The computer of claim 15, wherein processing the bitstream comprises storing the bitstream.

* * * * *